United States Patent Office 3,555,849
Patented Jan. 19, 1971

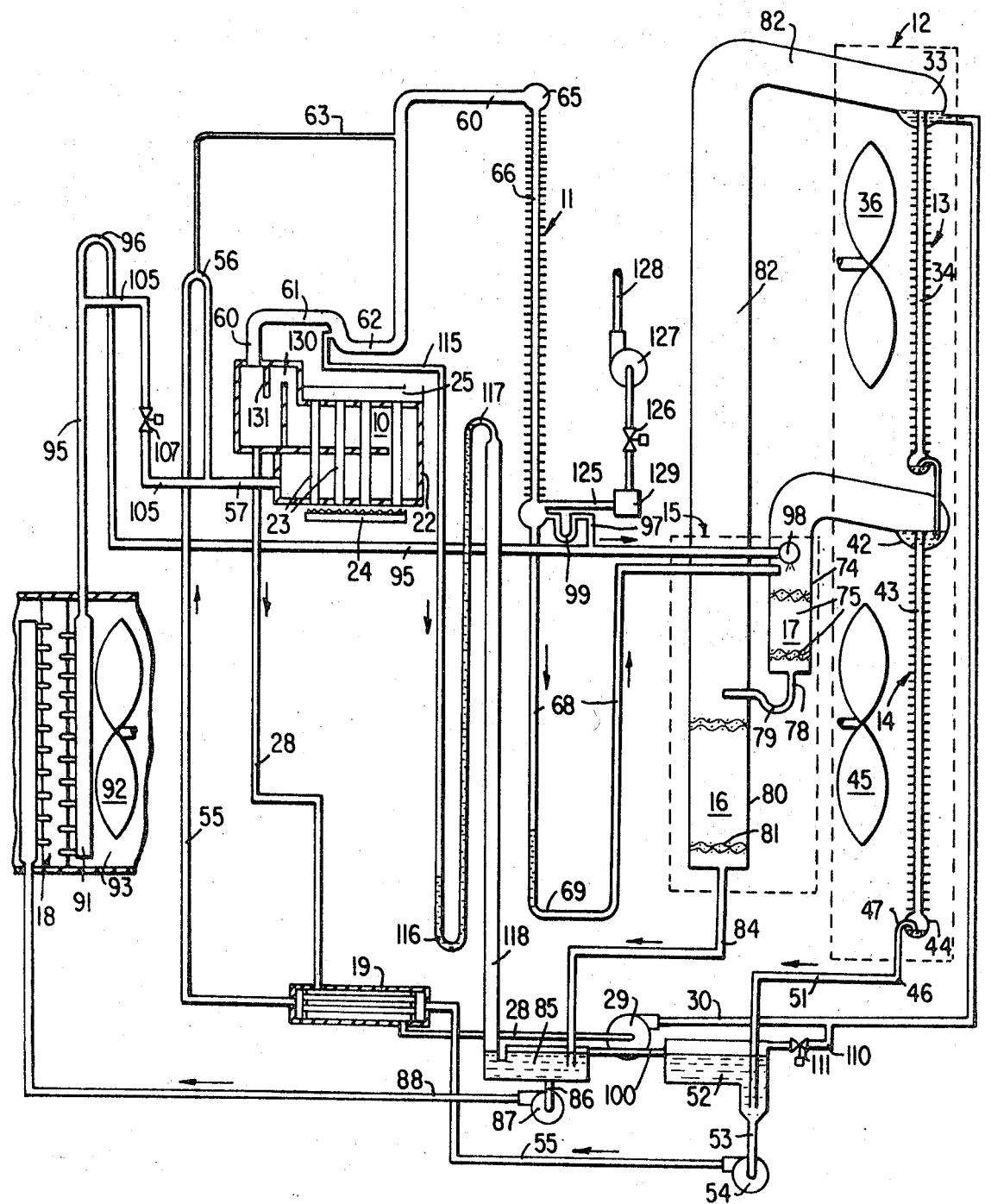

1

3,555,849
PURGING ABSORPTION REFRIGERATION
SYSTEMS
William W. Bell, Jr., Marcellus, N.Y., assignor to Carrier
Corporation, Syracuse, N.Y., a corporation of Delaware
Filed Dec. 18, 1968, Ser. No. 784,728
Int. Cl. F25b 43/04
U.S. Cl. 62—475                              7 Claims

ABSTRACT OF THE DISCLOSURE

A heating and cooling system having an absorption refrigeration mode of operation. A heating passage is provided for mixing absorbent and refrigerant together, the mixture being heated in the generator and passed through a heat exchanger in the heating mode of operation. Relatively noncondensible gases are passed from the absorber to the generator from which they pass to the condenser. A condensate trap is provided to prevent the escape of noncondensible gases from the condenser through the condensate passage. A condensate dilution passage is provided with a liquid trap to prevent the escape of noncondensible gases from the condenser through the condensate dilution passage. The generator is provided with a liquid trap operating on the heating cycle to prevent escape of noncondensible gases from the generator. A purge unit is provided to withdraw uncondensed gases from the condenser and discharge them from the system.

BACKGROUND OF THE INVENTION

It has been previously proposed to provide a heating and cooling system utilizing an absorption refrigeration cooling mode in combination with an arrangement for providing heating when refrigeration is not required. One of the problems with such arrangements is that the production of relatively noncondensible gases is often accelerated in the heating mode of operation. These gases find their way to the absorber where they materially impair the performance of the system and reduce the capacity of the system in the cooling mode of operation.

If the relatively noncondensible gases are purged from the absorber, it is necessary that the gases be passed to the absorber with a corresponding impairment of system performance before they can be removed from the system. On the other hand, it is difficult to achieve adequate purging in such a system from the refrigerant condenser because it is desirable that various passages communicating with the condenser be open to other parts of the machine on the heating mode. For example, it is desirable to allow the condenser to drain in the heating mode of operation to prevent freezing of refrigerant therein. If this is done, however, the condenser is open to the evaporator and the absorber during the heating mode, allowing the passage of noncondensible gases thereto. If, on the other hand, a refrigerant trap is employed to prevent the passage of noncondensible gases to the absorber during the heating mode, there is the danger of refrigerant freezing in the trap. This problem can be overcome by providing a dilution passage to dilute the refrigerant in the trap with absorbent, but then the dilution passage may carry noncondensible gases through the system under some conditions of operation.

Accordingly, it is a principal feature of this invention to provide an improved purging arrangement for a heating and cooling system which prevents passage of the gases to the absorber during both the heating and cooling modes of operation.

2

SUMMARY OF THE INVENTION

A heating and cooling system is provided having an absorber, an evaporator, a condenser and a generator arranged to provide an absorption refrigeration cooling mode of operation. The system is arranged to mix absorbent and refrigerant together and heat them in a generator in the heating mode of operation. The heated mixture is circulated through a suitable heat exchanger to provide heating.

In accordance with this invention, the condensate passage between the refrigerant condenser and the evaporator is provided with a liquid condensate trap which allows the passage of condensate from the condenser to the evaporator but blocks the passage of relatively noncondensible gases in both the heating and cooling modes of operation. A condensate dilution passage is provided for diluting the condensate in the condensate trap with absorbent solution to prevent freezing of the liquid therein. The condensate dilution passage is provided with a liquid trap for preventing the escape of noncondensible gases from the condenser to the evaporator during either mode of operation or during shutdowns. A purge arrangement is provided to purge the refrigerant condenser during the cooling mode of operation of the system. In addition, a liquid trap may be provided in the generator during the heating mode of operation to prevent the escape of relatively noncondensible gases formed in the generator to other parts of the system during the heating mode.

By means of this invention, noncondensible gases are prevented from leaving the condenser during both the cooling and heating modes of operation. It is not necessary to directly purge the absorber, and the condenser need be purged only during cooling mode for satisfactory operation of the system. During heating mode of operation, the noncondensible gases formed in the generator are trapped therein and do not interfere with the operation of the system. When the system is switched from the heating mode to the cooling mode of operation, the noncondensible gases trapped in the generator are released to the condenser from which they are purged from the system without passing through the absorber.

BRIEF DESCRIPTION OF THE
DRAWING

The drawing is a schematic flow diagram, partially in cross section, of a heating and cooling system having a purge arrangement in accordance with this invention showing certain liquid levels in the cooling mode of operation.

DESCRIPTION OF THE PREFERRED
EMBODIMENT

This invention will be described with respect to a preferred embodiment wherein a two-stage adiabatic refrigerant evaporator and a two-stage air-cooled absorber are employed in cooling mode of operation. However, this invention may be employed in systems having any number of either adiabatic or non-adiabatic evaporator stages.

The preferred refrigerant is water and the preferred absorbent is an aqueous solution of lithium bromide, although other absorbent-refrigerant combinations, especially those including a lithium halide salt, may be employed instead. As used herein, a concentrated solution of lithium bromide which is strong in absorbing power will be referred to as "strong" solution and a dilute solution of lithium bromide which is weak in absorbing power will be referred to as "weak" solution. "Refrigerant" used herein includes pure water which may be referred to as "concentrated refrigerant" and refrigerant water having lithium bromide therein may be referred to as "dilute refrigerant." A heat transfer promoting additive, such as 2-ethyl-n-hexanol, may be added to the absorbent solution.

Referring to the drawing, the system comprises a generator 10, a condenser 11, an absorber 12 having a low pressure stage 13 and a high pressure stage 14, an adiabatic evaporator 15 having a lower temperature stage 16 and a high temperature stage 17, an air conditioning heat exchanger 18 and a solution heat exchanger 19. Heat exchanger 18 provides sensible heat exchange between cold liquid refrigerant and air being conditioned when the system is connected to provide refrigeration. In such operation, heat exchanger 18 functions as a heat absorbing heat exchanger.

Generator 10 comprises a shell 22 having a plurality of fire tubes 23 extending therethrough. Fuel burner 24 discharges hot gas through fire tubes 23 into flue gas collector 25. Other types of generators, such as those employing steam or hot water as a heating fluid, may be alternatively utilized.

Weak absorbent solution is supplied to generator 10 and boiled therein to concentrate the solution in the cooling mode of operation. The resulting strong absorbent solution passes through strong solution passage 28 and the shell side of solution heat exchanger 19 to strong solution pump 29. The strong solution is pumped through strong solution passage 30 to low pressure vapor header 33 disposed at the top of low pressure absorber stage 13.

Low pressure absorber stage 13 comprises a plurality of vertically disposed finned absorber heat exchange tubes 34 connected at their upper ends by a low pressure vapor header 33 and at their lower ends by a low pressure liquid header 35. Strong solution overflows the open upper ends of absorber tubes 34 and passes downwardly along the interior surface of the absorber tubes while absorbing refrigerant vapor therein. The heat of the absorption process is rejected to ambient air passed over the exterior surfaces of absorber tubes 34 by fan 36. The absorbent solution is somewhat diluted by absorption of refrigerant vapor in tubes 34, so that the solution collected in low pressure header 35 is of intermediate concentration. The intermediate solution passes through siphon tube 37 having an upwardly arched portion 38 into high pressure vapor header 42 of high pressure absorber stage 14.

High pressure absorber stage 14 comprises a plurality of finned vertical absorber heat exchange tubes 43 joined at their upper ends by high pressure vapor header 42 and at their lower ends by high pressure liquid header 44. Intermediate absorbent solution overflows the upper open ends of absorber tubes 43 and passes downwardly along the interior surfaces of the absorber tubes while refrigerant vapor is being absorbed therein. The heat of the absorption process is rejected from high temperature absorber stage 14 to ambient air passed over the exterior surfaces of absorber tubes 43 by fan 45.

Absorbent solution passing downwardly through absorber tubes 43 is further diluted by the absorption of refrigerant vapor therein so that the absorbent solution collected in high pressure liquid header 44 is weak in absorbing power. The weak solution passes from low pressure liquid header 44 through a siphon tube 46 having an upwardly arched portion 47 through weak solution passage 51 into weak solution sump 52. The weak solution then passes from weak solution sump 52 through weak solution passage 53 to weak solution pump 54. The weak solution is then pumped through weak solution passage 55 and the interior tubes of solution heat exchanger 19 through an upwardly extending loop 56, and weak solution passage 57 into generator 10 for reconcentration.

Refrigerant vapor is formed in generator 10 by the boiling of absorbent solution. This refrigerant vapor passes from generator 10 to condenser 11 through refrigerant vapor passage 60. Refrigerant vapor passage 60 has an upwardly extending loop 61 and a downwardly extending loop or trap 62 therein, which are free of liquid in the cooling mode. A vent line 63 vents the upper portion of loop 56 to the condenser pressure in passage 60.

Refrigerant condenser 11 comprises a plurality of vertical finned tubes 66 connected at their upper ends by refrigerant vapor header 65 and at their lower ends by refrigerant condensate header 67. Preferably, condenser 11 is located to receive air passing over the tubes in absorber 12 in order to utilize the absorber fans for passage of cooling air over the condenser. The refrigerant condensate formed in condenser 11 passes from header 67 through condensate passage 68 having a downwardly extending loop or trap 69 into high temperature evaporator stage 17 of adiabatic refrigerant evaporator 15.

High temperature evaporator stage 17 comprises a shell 74 having packing material 75 therein. A vapor passage 76 extends between high temperature evaporator stage 17 and vapor header 42 of high pressure absorber stage 14. A small quantity of refrigerant is evaporated from refrigerant passing through evaporator stage 17, thereby flash-cooling the remaining refrigerant. The cooled refrigerant passes from high temperature evaporator stage 17 to low temperature evaporator stage 16 through refrigerant passage 78 having a downwardly extending trap 79.

Low temperature evaporator stage 16 comprises a shell 80 having packing material 81 therein and a refrigerant vapor passage 82 communicating with vapor header 33 of low pressure absorber 13. As in the preceding stage, a small quantity of refrigerant is evaporated in low temperature evaporator stage 16 which results in flash-cooling the remainder of refrigerant passing therethrough. In all, only about one percent of the total refrigerant flowing through adiabatic evaporator 15 need be evaporated to satisfactorily flash-cool the remaining ninety-nine percent. A conventional single- or multi-stage evaporator having a heat absorbing heat exchanger therein may be employed, if desired.

The cold refrigerant then passes from low temperature evaporator stage 16 through refrigerant passage 84 into refrigerant sump 85. The cold refrigerant passes from sump 85 through refrigerant passage 86 to pump 87 and is pumped through passage 88 to inlet header 90 of heat absorbing heat exchanger 18. Heat exchanger 18 may comprise an air conditioning fan-coil unit having an inlet header 90, an outlet header 91 and a fan 92 for passing air to be conditioned through the fan-coil unit located in duct 93. Heat exchanger 18 passes cold liquid refrigerant in heat exchange relation with the air passing thereover to cool the air which constitutes a refrigeration load in the cooling mode of operation. After absorbing heat from the air being cooled, the warmed liquid refrigerant passes through refrigerant passes 95 having an upwardly extending loop 96 and restricted spray nozzle 98 back to high temperature evaporator stage 17 of adiabatic evaporator 15 for recooling of the refrigerant.

A refrigerant reconcentration and vapor pressure control passage 100 extends between sumps 85 and 52 as shown in the drawing. This passage serves to adjust the concentration and vapor pressure of refrigerant and absorbent solution in the system under various operating conditions as explained in Leonard application Ser. No. [Attorneys' docket 151–44–1].

A heating passage 105 communicates with passage 95 at a point below the top of upwardly arched loop 96. A mode control valve 107 is disposed in passage 105 which communicates at its other end with generator 10 through passage 57. Another heating passage 110 having a mode control valve 111 therein communicates between discharge of solution passage 30 and absorbent sump 52. A third heating passage 115 has an upper end connected between upwardly arched portion 61 and downwardly arched portion 62 of passage 60. Passage 115 has a downwardly extending loop 116 and an upwardly extending loop 117 therein. The downward leg 118 of upwardly extending loop 117 is connected to refrigerant sump 85 and is of larger diameter than the legs of loop 116 to prevent siphoning of loop 116.

When the system is in the cooling mode of operation, mode control valves 107 and 111 are closed and the liquid levels are approximately as shown in the drawing. Loop 116 is filled with sufficient liquid to balance the pressure difference between generator 10 and refrigerant sump 85 to prevent passage of vapor therebetween. At or above design ambient absorber temperature, the refrigerant circulated through evaporator 15 and heat exchanger 18 is preferably substantially pure water and the strong absorbent solution concentration is preferably about 64.5% lithium bromide by weight.

To switch from the cooling mode of operation to the heating mode, control valves 107 and 111 are opened. Operation of pumps 54 and 29, and fans 36 and 45, is discontinued. Opening of valve 107 causes the fluid passing through passage 95 from heat exchanger 18 to be diverted into passage 105 because passage 105 and connecting passage 57 is below the top of loop 96 which is above the top of loop 61. Generator 10 and trap 62 are flooded with a mixture of refrigerant and absorbent solution by pump 87. The liquid level in passage 60 is below the junction of vent line 63 and below the top of loop 96. All of the refrigerant and absorbent solution in the system is mixed together to form heating solution when the system is in the heating mode.

A major portion of the heated solution (90%) passes upwardly through loop 61 into heating passage 115. The level of the heated solution is above the level of upwardly extending loop 117 and it will flow by gravity through passage 115 downwardly extending leg 118 into refrigerant sump 85. The heated solution passes from the refrigerant sump 85 through passage 86 and is pumped by pump 87 via passage 88 through the heat exchanger 18.

A minor portion (10%) of the soluiton heated in generator 10 continues to pass downwardly through passage 28, the shell side of heat exchanger 19, through inoperative pump 29, passages 30 and 110, into absorbent sump 52, and through control passage 100 into refrigerant sump 85, from which it passes to heat exchanger 18, as previously described.

When it is desired to terminate heating and return to the cooling mode of operation, mode control valves 107 and 11 are closed. Pumps 54 and 29, and fans 36 and 45 are again energized. Closing of valve 107 terminates direct flow of solution from heat exchanger 18 to generator 10. Instead, solution is pumped from heat exchanger 18, through upwardly extending loop 96 and passage 95, and serially through high temperature evaporator 17 and low temperature evaporator 16 of adiabatic evaporator 15. The solution in generator 10 is heated to the boiling temperature to concentrate the solution. The level of solution in the generator drops so that vapor passage 60 is free of liquid and contains vapor. Loop 116 is sealed with liquid and prevents vapor from passing therethrough.

The volume of strong absorbent solution passing to sump 52 will decrease as refrigerant is boiled from it in the generator, and the level of solution in sump 52 will tend to drop. Conversely, the quantity of refrigerant passing through evaporator 15 will increase due to the refrigerant added to the refrigerant circuit from condenser 11, and the level of refrigerant in sump 85 will tend to rise. When the level of refrigerant in sump 85 tends to exceed the level of absorbent solution in sump 52, diluted refrigerant will flow through refrigerant reconcentration and vapor pressure control passage 100 into absorbent sump 52 to balance the liquid levels in the two sumps. At absorbent ambient temperature above design conditions, diluted refrigerant will continue to be bled from sump 85 into sump 52 until the refrigerant has been substantially concentrated and the absorbent solution has been concentrated to the desired full-load design operating concentration.

If the ambient temperature of air passed over absorber 12 is less than the design temperature, the process of concentrating the absorbent solution and the refrigerant will stop at some intermediate concentration where an equilibruim is reached between absorber capacity and refrigeration load against absorber capacity. Upon a drop in absorbent and refrigerant will adjust itself to provide a variable vapor pressure effect which just balances refrigeration load against absorber capacity. Upon a drop in ambient absorber temperature, the level of weak solution in sump 52 tends to increase above the level of refrigerant in sump 85, absorbent solution will begin to flow from sump 52 through vapor pressure control passage 100 into the refrigerant sump 85. This passage of absorbent solution into the refrigerant sump will dilute the refrigerant being circulated through heat exchanger 18 to evaporator 15 with absorbent salt until the evaporation temperature in the evaporator rises back to the desired design evaporator temperature at which the refrigeration load just balances the absorber capacity. Conversely, if the absorber ambient temperature rises, the level of solution in sump 52 tends to drop below the level of refrigerant in sump 85 and diluted refrigerant is bled through passage 100 to generator 10 via lines 55 and 57. Pure refrigerant condensate from condenser 11 is passed back to evaporator 15 and concentrated absorbent solution is passed from the generator back to the absorber circuit. Eventually, the system will concentrate both the absorbent and the refrigerant until the refrigeration load and absorber capacity balance each other or until the refrigerant is concentrated to substantially pure water.

In accordance with this invention, there is provided a refrigerant condensate dilution passage 97, having liquid trap 99 therein, connected between refrigerant passage 95 and refrigerant condensate header 67 of condenser 11. During operation of the system in the cooling mode, a small quantity of refrigerant is continuously bled from passage 95 into condensate header 67. Refrigerant passage 97 is preferably restricted to meter a predetermined desired quantity of refrigerant into the condensate header. Spray nozzle 98 provides sufficient restriction to assure that refrigerant is continuously bled into header 67 through passage 97.

During periods of operation of the refrigeration system at low absorber ambient temperature, the vapor pressure of the absorbent solution in absorber 12 may drop below that corresponding to the freezing temperature of pure water. When the absorber temperature is about 55° F., the concentration of absorbent solution in the absorber may be about 54.5 percent lithium bromide and the refrigerant concentration may be about 63 percent water. Under these conditions, the dew point in the absorber is about 32° F. At any absorber temperature below about 55° F., the absorber dew point will be below the freezing point of pure water. The refrigerant will not freeze in the evaporator because it is diluted with absorbent solution; however, the condensate from condenser 11 would freeze if introduced into the evaporator in undiluted state.

Bleeding a small quantity of diluted refrigerant through condensate dilution passage 97 will cause some absorbent salt to be added to the pure refrigerant condensate passing to evaporator through condensate passage 68. By properly sizing passage 97, it is possible to prevent freezing of the condensate by diluting it with sufficient absorbent to decrease its freezing temperature below the dew point in absorber 12. Accordingly, at any time during operation of the system, when refrigerant passing through heat exchanger 18 is diluted, there will be a corresponding dilution of the refrigerant condensate in passage 68. At times when the refrigerant is not diluted, it will not be necessary to dilute the condensate because the absorber will be operating at a dew point above freezing.

During changeover from cooling to the heating mode of operation, loop 96 will drain some absorbent into condensate header 67 to provide some winter freeze protection for condensate passage 68 providing that the system is operated to assure the presence of diluted refrigerant in passage 95.

A purge passage 125 having a purge valve 126 and a vacuum purge pump 127 therein is connected to condensate header 67 of condenser 11. During the cooling mode of operation, relatively noncondensible gases are withdrawn from condenser 11 by purge pump 127 and expelled to atmosphere through purge passage 128, when solenoid valve 126 is open. After the condenser has been purged, valve 126 may be closed and vacuum pump 127 may be shut off. A suitable refrigerant and/or additive trap 129, such as a canister of silica gell and activated charcoal, may be provided in purge passage 125 ahead of valve 126 to strip refrigerant vapor and additive vapor from the uncondensed gas, which is withdrawn from the system, by purge pump 127. The stripped refrigerant and addtive may be returned to the system by periodically regenerating the trapping materials with heat.

While a conventional vacuum pump purge unit has been described, for purposes of illustration, any type of purge unit may be employed to remove the noncondensibles from the system. For example, an ejector or other type of purge unit, such as shown in United States Pats. 3,131,546 and 3,367,135, may be utilized, if desired.

In cooling mode operation, relatively noncondensible gases in low pressure absorber 13 are passed along with intermediate strength solution through siphon tube 37 into high pressure vapor header 42 of high pressure absorber 14. Likewise, the relatively noncondensible gases in high pressure absorber 14 are passed through siphon tube 46 along with weak solution pump 54. These uncondensed gases are pumped through weak solution passage 55 into generator 10 from which they pass through vapor passage 60 to the condenser.

The refrigerant in loop 69 of refrigerant condensate passage 68 prevents the noncondensible gases from passing through the condensate line to the evaporator or to the absorber. The liquid in trap 99 of condensate dilution line 97 prevents the passage of noncondensible gases from the condenser through the dilution line to either the evaporator or the absorber. Traps 69 and 99 are filled with liquid during both the heating and cooing modes of operation of the system, so that noncondensibe gases are effectively trapped in the generator and/or the condenser during both modes of operation of the system.

During the heating mode of operation, generator 10 is flooded with solution and baffle 131 forms a liquid trap which retains the noncondensible gases formed in the generator. These gases remain in vapor space 130 until the trap temporarily blows to the condenser or until the generator is unflooded by switching from the heating to the cooling mode of operation. When the system is switched to the cooling mode of operation, the uncondensed gas trapped in the generator is released through vapor passage 60 into the condenser and may be purged from the system. If desired, trap 130 in generator 10 may be omitted and the gases may be released to the condenser during the heating mode provided they are not free to pass to the absorber or evaporator where they would inhibit changeover to cooling mode operation.

It will be seen that by the practice of this invention, it is not necessary to directly purge the absorber, although such a purge may be employed, if desired. In any event, the purge requirements for the absorber are reduced because the noncondensible gases formed in the generator or accumulated in the condenser are prevented from passing from the condenser to other parts of the system.

An air-cooled absorption system has been described, but it will be apparent that the principles of this invention are equally applicable to a system employing a liquid-cooled absorber and condenser. Similarly, while the invention has been described with respect to an air conditioning system employing a fan-coil heat exchanger for absorption and rejection of heat in the cooling and heating modes, respectively, the invention is also applicable to water chillers and other types of refrigeration-heating systems. Heat exchanger 18 may comprise a heat exchanger disposed in a nonadiabatic evaporator. Separate heat rejecting and heat absorbing heat exchangers may be employed if desired. Refrigerant sump 85 may be made integral with evaporator 15 and solution sump 52 may be combined with absorber 12.

While a preferred embodiment of the invention has been described for purposes of illustration, it will be appreciated that the invention may be otherwise embodied within the scope of the following claims.

I claim:
1. An absorption refrigeration system having a cooling mode of operation comprising:
   (A) a generator for boiling absorbent solution to concentrate said solution;
   (B) a condenser for condensing refrigerant vapor formed in the generator;
   (C) an evaporator for evaporating refrigerant condensed in the condenser to provide cooling;
   (D) an absorber for absorbing refrigerant vapor formed in the evaporator into absorbent solution concentrated in the generator;
   (E) gas purging means connected with the condenser for purging relatively noncondensible gas from said condenser;
   (F) condensate passage means for passing refrigerant condensate from the condenser to the evaporator, said condensate passage means having a liquid trap therein blocking the passage of uncondensed gas from said condenser to said evaporator through said condensate passage; and
   (G) condensate dilution passage means in communication with said condensate passage means for diluting the refrigerant condensate passing through said condensate passage means, said condensate dilution passage means having a liquid trap therein for passing liquid and blocking the passage of uncondensed gas from said condenser through said condensate dilution passage.

2. An absorption refrigeration system as defined in claim 1 including passage means for transferring relatively noncondensible gases from said absorber to said generator for passage to said condenser and purging thereof from said condenser.

3. An absorption refrigeration system as defined in claim 1 including refrigerant dilution means for controlling the vapor pressure of the refrigerant in the evaporator; said condensate dilution means comprising means for diluting the condensate with diluted refrigerant during periods of operation of said system when said refrigerant is diluted, said diluted refrigerant forming a liquid seal in the liquid trap in said condensate dilution passage means during said periods of operation.

4. An absorption refrigeration system as defined in claim 1 wherein said condenser includes a refrigerant condensate header; and said gas purging means, said condensate passage means, and said condensate dilution passage means are each in direct communication with said refrigerant condensate header.

5. An absorption refrigeration system as defined in claim 1 including:
   (A) said evaporator comprising an adiabatic evaporator for evaporating a portion of the refrigerant to cool the remainder of the refrigerant therein;
   (B) a heat absorbing heat exchanger for cooling a refrigeration load;
   (C) refrigerant passage means for passing cooled refrigerant liquid from said adiabatic evaporator through said heat absorbing heat exchanger back to said adiabatic heat exchanger for recooling therein;
   (D) refrigerant dilution means for controlling the vapor pressure of the refrigerant in said adiabatic evaporator; and
   (E) said condensate dilution passage means comprising means for passing refrigerant from said refrigerant passage means into said condensate passage means to dilute the refrigerant condensate passing to said adiabatic evaporator with diluted refrigerant during periods of operation of said system when the refrigerant in said adiabatic evaporator is diluted, said diluted refrigerant forming a liquid seal in said condensate dilution passage during said periods of operation.

6. An absorption refrigeration system as defined in claim 1 wherein said system further includes a heating mode of operation, and liquid trap means associated with said generator when said system is in the heating mode of operation for preventing the escape of noncondensible gases formed in said generator to other parts of said system during said heating mode.

7. An absorption refrigeration system as defined in claim 1 wherein said system includes heating passage means for providing a heating mode of operation during periods when refrigeration is not desired, said liquid trap in said condensate passage and said liquid trap in said condensate dilution passage containing liquid and forming a liquid seal during the heating mode of operation of said system to trap the relatively noncondensible gases in said condenser during the heating mode of operation and to prevent their escape from the condenser to the evaporator and to the absorber.

References Cited

UNITED STATES PATENTS 2,400,137   5/1946   Reid, Jr. _____ 62—475X
2,818,234   12/1957  Berry _____ 165—62

WILLIAM E. WAYNER, Primary Examiner